United States Patent
Small

(10) Patent No.: US 9,640,865 B2
(45) Date of Patent: May 2, 2017

(54) METHOD AND APPARATUS FOR FORMING A REMOTE BEAM

(75) Inventor: David Small, Numeralla (AU)

(73) Assignee: Locata Corporation Pty Ltd, Griffith, ACT (AT)

(*) Notice: Subject to any disclaimer, the term of this patent is extended or adjusted under 35 U.S.C. 154(b) by 721 days.

(21) Appl. No.: 13/878,426

(22) PCT Filed: Oct. 21, 2011

(86) PCT No.: PCT/AU2011/001346
§ 371 (c)(1),
(2), (4) Date: Apr. 9, 2013

(87) PCT Pub. No.: WO2012/051669
PCT Pub. Date: Apr. 26, 2012

(65) Prior Publication Data
US 2013/0207842 A1    Aug. 15, 2013

(30) Foreign Application Priority Data
Oct. 21, 2010    (AU) .................. 2010904696

(51) Int. Cl.
*H01Q 3/00*    (2006.01)
*G01S 1/04*    (2006.01)
(Continued)

(52) U.S. Cl.
CPC ............ *H01Q 3/26* (2013.01); *G01S 1/042* (2013.01); *G01S 1/66* (2013.01); *G01S 5/0215* (2013.01); *H01Q 3/005* (2013.01); *H01Q 21/061* (2013.01)

(58) Field of Classification Search
CPC  H01Q 3/005; G01S 1/66; G01S 1/042; G01S 5/0215
(Continued)

(56) References Cited

U.S. PATENT DOCUMENTS

| | | |
|---|---|---|
| 5,134,715 A | 7/1992 | Parl et al. |
| 5,434,578 A | 7/1995 | Stehlik |

(Continued)

FOREIGN PATENT DOCUMENTS

| | | |
|---|---|---|
| EP | 2040333 A1 | 3/2009 |
| JP | 2000-155171 A | 6/2000 |

(Continued)

OTHER PUBLICATIONS

Yoo et al 'Multipath Mitigation Technique Using Null-Steering Beamformer for Positioning System', 57th IEEE Semiannual Vehicular Technology Conference (VTC 2003-Spring), Apr. 22-25, 2003, vol. 1, pp. 602-605.

(Continued)

*Primary Examiner* — Tashiana Adams
*Assistant Examiner* — Helena Seraydaryan
(74) *Attorney, Agent, or Firm* — Wiley Rein LLP

(57) ABSTRACT

A device and method are provided for forming a beam of a transmit antenna array in the direction of a positioning receiver. Since the beam of the transmit antenna array is formed remotely by the positioning receiver, the received gain of the incoming positioning signal is maximized while signals from other directions are attenuated, thereby mitigating any unwanted effects of multipath. Depending on the number of elements in the transmit antenna array and their physical distribution, the width of the beam can be made finer such that the positioning receiver only requires a simple omni-directional antenna to achieve an accurate positioning solution.

30 Claims, 7 Drawing Sheets

(51) Int. Cl.
*H01Q 3/26* (2006.01)
*H01Q 21/06* (2006.01)
*G01S 5/02* (2010.01)
*G01S 1/66* (2006.01)

(58) Field of Classification Search
USPC ......................................................... 342/376
See application file for complete search history.

(56) References Cited

U.S. PATENT DOCUMENTS

| | | | |
|---|---|---|---|
| 5,559,519 A | 9/1996 | Fenner | |
| 5,572,219 A | 11/1996 | Silverstein | |
| 5,585,803 A | 12/1996 | Miura | |
| 5,790,071 A | 8/1998 | Silverstein | |
| 6,166,690 A | 12/2000 | Lin | |
| 6,614,395 B2* | 9/2003 | Talbot | G01C 15/002 342/127 |
| 8,934,844 B2* | 1/2015 | Small | G01S 19/22 455/562.1 |
| 2002/0084933 A1* | 7/2002 | Krasner | G01S 5/0027 342/357.63 |
| 2002/0131035 A1* | 9/2002 | Watanabe | G01S 7/4915 356/5.1 |
| 2003/0117310 A1* | 6/2003 | Kikuchi | G01V 8/005 342/22 |
| 2004/0183719 A1 | 9/2004 | Natsume | |
| 2006/0290818 A1* | 12/2006 | Asamura | H04N 9/78 348/663 |
| 2007/0201402 A1* | 8/2007 | Cho | H04B 7/155 370/330 |
| 2007/0222671 A1* | 9/2007 | Nohmi | G01N 21/3581 342/142 |
| 2008/0026797 A1* | 1/2008 | Nanda | H01Q 1/246 455/562.1 |
| 2008/0079634 A1* | 4/2008 | Nakamura | G01S 3/46 342/368 |
| 2008/0108310 A1* | 5/2008 | Tong | H04B 7/0617 455/69 |
| 2008/0291864 A1 | 11/2008 | Chang | |
| 2009/0074117 A1* | 3/2009 | Fujita | H04B 1/7183 375/343 |
| 2009/0121916 A1 | 5/2009 | Miyake | |
| 2010/0109873 A1* | 5/2010 | DeRose | G06K 7/10316 340/572.7 |
| 2011/0143692 A1* | 6/2011 | Sofer | H04B 7/0608 455/88 |
| 2011/0151781 A1* | 6/2011 | Kainulainen | G01S 3/16 455/41.2 |
| 2012/0108193 A1 | 5/2012 | Small | |
| 2012/0113828 A1* | 5/2012 | Head | H04B 7/0617 370/252 |

FOREIGN PATENT DOCUMENTS

| | | |
|---|---|---|
| JP | 2004-198312 A | 7/2004 |
| JP | 2004-245602 A | 9/2004 |
| JP | 2005-257298 A | 9/2005 |
| JP | 2009-115757 A | 5/2009 |
| WO | 03/007488 A2 | 1/2003 |

OTHER PUBLICATIONS

Search report issued on counterpart Chinese application No. 201180050386.1.
Search report and opinion issued on counterpart European application No. 11833641.1.

* cited by examiner

METHOD AND APPARATUS FOR FORMING A REMOTE BEAM

FIELD OF THE INVENTION

The present invention relates generally to positioning systems and in particular to subsystems for receiving positioning signals.

The invention has been developed primarily for forming remote beams for receiving positioning signals in multipath environments and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

As is known in the art, positioning technologies generally operate by measuring the time a signal takes to traverse from a signal source to the receiving device. In most prior art applications, this measurement is taken by comparing the time at which a signal is sent with the time at which the same signal is received. Common positioning systems such as GPS use three or more such signals and, using trilateration, calculate an object's position. Since the measurement calculations are time-sensitive, a fourth signal is commonly required to ensure that the clocks of the source and the receiver are properly synchronised.

Multipath refers to the phenomenon whereby positioning signals are reflected off other objects, such as walls and furniture. This is especially prevalent in an enclosed environment, such as indoors, but is also a significant problem in built up areas, such as in cities. Simplistically speaking, reflected signals take longer to traverse from a source to a receiver, therefore affecting the accuracy of the measurements. Also the receiver sees conflicting signals originating from the same source, having different timing information. Some modern receivers use selection algorithms to try to determine the most appropriate signal to use in position determination. However, receivers typically cannot differentiate multipath signals from the genuine positioning signals to any high degree of accuracy.

Also known in the art are phased arrays, consisting of a number of antenna elements that can be individually controlled to direct a beam. In a typical phased array, signals received at each element are individually phase and gain manipulated, the exact manipulation required depending on the direction of the beam required. The resulting phase and gain manipulated signals from each element are then summed to obtain the desired direction of the beam.

One method for mitigating the problem of multipath is discussed in published international patent application WO 2011/000049 A1 which is assigned to the present applicant and hereby incorporated in its entirety by reference. This application discusses a method to form a beam using a local receiver antenna to receive a positioning signal from a transmission source, thereby ignoring other signals in a multipath environment.

While this method is successful in mitigating the effects of multipath, the local receiver antenna necessarily requires a number of physical antenna elements. This limits the size to which the local receiver antenna can be miniaturised, and therefore limits the portability of the receiver. Portability is not an issue when the receiving apparatus is to be mounted to, for example, a forklift. However, if receiving apparatus is to be incorporated into, for example, a mobile telephone, then further miniaturisation of the receiver antenna is necessary.

The present invention describes an apparatus and method for utilising antenna technology that is already deployed in portable hand-held equipment in high-precision positioning applications.

SUMMARY OF THE INVENTION

It is an object of the present invention to overcome or ameliorate at least one of the disadvantages of the prior art, or to provide a useful alternative.

It is a further object of the present invention to create multiple beams simultaneously.

It is a further object of the present invention to utilise antenna technology that is already deployed in portable hand-held equipment in high-precision positioning applications.

It is a further object of the present invention to use a single RF front end for simultaneously forming the multiple beams.

It is a further object of the present invention to form relatively narrow beams using relatively large numbers of elements (generally more than 32 elements), whilst minimizing electronic complexity.

It is a further object of the present invention to re-use standard positioning receiver components/logic blocks to reduce power consumption, cost and complexity.

It is a further object of the present invention to provide a scalable system that is capable of making use of external receiver antennas to increase the precision of the position solution.

It is a further object of the present invention to provide a method of simultaneously forming multiple beams in different directions using relatively large numbers of elements (generally more than 32 elements) for positioning systems, whist obviating the need for complicated circuitry and calibration.

According to one aspect of the invention there is provided a device for remotely forming a beam at antenna arrays, the device including:
  an antenna array having a plurality of spatially distributed elements;
  a positioning-unit device coupled with said antenna array, said positioning-unit device configured to switch said antenna elements between first and second states in a predetermined sequence wherein, in said first state, said elements are configured to transmit a positioning signal; and
  a receiver configured to receive said positioning signal from said antenna array, said receiver having a processor for generating a reference signal, mixing said positioning signal with a modified reference signal to generate a mixed signal and summing the mixed signal over a predetermined integration period to generate an accumulated signal, wherein said reference signal is modified prior to being mixed with said received signal such that said accumulated signal is indicative of the direction and magnitude of the beam of the antenna array.

Preferably, the receiver includes at least one receive channel having a correlator, wherein the correlator is configured to selectively manipulate the phase and/or gain of the reference signal in substantial synchronism with receipt of the positioning signal.

The positioning signal preferably includes a pseudorandom code having a unique chip sequence within a predefined chip period, the unique chip sequence being used to provide the substantial synchronisation between the reference signal and the positioning signal. Preferably the predetermined integration period is divided into a number of sub-integration periods wherein each of the elements are switched to the first state for the duration of the sub-integration period.

The switching of each element to the first state is preferably aligned to a chip boundary within the unique chip sequence, wherein the sub-integration period is synchronised to begin at the same time as the chip boundary in the next chip period.

Preferably, each sub-integration period is configured to access a respective accumulator for storing the positioning signal, wherein each respective accumulator is mixed with the modified reference signal to generate the mixed signal.

The duration of each sub-integration period within the predetermined integration period is preferably dynamically adjustable such that the positioning signal transmitted from one or more elements are selectively excluded from being mixed with the reference signal.

Preferably, the manipulation of the phase and/or gain is achieved by respectively applying a phase and/or gain offset to the reference signal, wherein the value of the phase and/or gain offset is calculated in dependence upon the predetermined sequence.

The correlator preferably includes a carrier numerical control oscillator (NCO) and the reference signal is synthesised in the carrier NCO.

Preferably, the value of said phase and/or gain offset is calculated by the processor in real time. Alternatively, the value of the phase and/or gain offset is calculated in advance and stored in a database that is available for retrieval by the processor.

Preferably, an element is active in said first state and inactive in said second state. Preferably, elements switched to the second state are configured to be non-resonant such that the effects of mutual-coupling are ameliorated.

Preferably, the antenna elements are spatially distributed in a three dimensional configuration such that the device can form beams in one or more dimensions.

Each receiver preferably includes multiple receive channels, wherein each receive channel is adaptable to form at least one beam.

According to another aspect of the invention there is provided a device for remotely forming a beam at an antenna arrays, the device including:
an antenna array having a plurality of spatially distributed elements;
a positioning-unit device coupled with said antenna array, said positioning-unit device configured to
  a) switch said antenna elements between first and second states in a predetermined sequence wherein, in said first state, said elements are configured to transmit a modified positioning signal; and
  b) synthesise a positioning signal and modify said positioning signal, in substantial synchronism with said predetermined sequence, to generate a modified positioning signal; and
a receiver configured to receive said modified positioning signal from said antenna array, said receiver having a processor for generating a reference signal, mixing said modified positioning signal with said reference signal to generate a mixed signal and summing the mixed signal over a predetermined period to generate an accumulated signal such that said accumulated signal is indicative of the direction and magnitude of the beam of the antenna array.

According to another aspect of the invention there is provided a system for forming composite beams between antenna arrays, the system including:
a transmit antenna array having a plurality of spatially distributed elements, said transmit antenna array being coupled to a positioning-unit device that is configured to switch said antenna elements between first and second states in a predetermined sequence wherein, in said first state, said elements are configured to transmit a positioning signal;
a receive antenna array having a plurality of spatially distributed elements, said receive antenna array being coupled to a positioning receiver that is configured to switch said antenna elements between first and second states in a predetermined sequence wherein, in said first state, said elements are configured to receive a positioning signal; and
said positioning receiver having a processor configured to:
  receive said positioning signal from said transmit antenna array,
  synthesize a reference signal:
  modify said reference signal in substantial synchronism with the switching of said elements of said transmit and receive antenna arrays to the first state to generate a modified reference signal;
  mix said positioning signal with said modified reference signal to generate a mixed signal; and
  sum the mixed signal over a predetermined period to generate an accumulated signal such that said accumulated signal is indicative of the direction and magnitude of said beam of said transmit and receive antenna arrays.

According to another aspect of the invention there is provided a method for forming a beam at antenna arrays, the method including the steps of:
a) switching, at a positioning-unit device, spatially distributed elements of said antenna array from a second state to a first state in a predetermined sequence, wherein, in said first state, said elements are configured to transmit a positioning signal;
b) receiving, at a receiver, a positioning signal;
c) generating, in a correlator of the receiver, a reference signal for correlation with said positioning signal;
d) applying, in substantial synchronisation with receiving said positioning signals, a predetermined offset to said reference signal to create a modified reference signal;
e) mixing said positioning signal with said modified reference signal to create a mixed signal; and
f) accumulating said mixed signal over an integration period to create an accumulated signal, wherein said accumulated signal is indicative of the direction and magnitude of said beam of said antenna array.

According to another aspect of the invention there is provided a method for forming composite beams between antenna arrays, the method including the steps of:
a) switching, at a positioning-unit device, spatially distributed elements of a transmit antenna array from a second state to a first state in a predetermined sequence, wherein, in said first state, said elements are configured to transmit a positioning signal;
b) switching, at a positioning receiver, spatially distributed elements of a receive antenna array from a second state to a first state in a predetermined sequence, wherein, in said first state, said elements are configured to receive a positioning signal;

c) receiving, at a positioning receiver, a positioning signal;

d) generating, in a correlator of said positioning receiver, a reference signal for correlation with said positioning signal;

e) modifying said reference signal in substantial synchronism with the switching of said elements of said transmit and receive antenna arrays to the first state to generate a modified reference signal;

f) mixing said positioning signal with said modified reference signal to create a mixed signal; and g) accumulating said mixed signal over an integration period to create an accumulated signal, wherein said accumulated signal is indicative of the direction and magnitude of said beam of said transmit and receive antenna arrays.

According to another aspect of the invention there is provided a method for forming a beam at antenna arrays, the method including the steps of:

a) synthesising, in a positioning-unit device, a positioning signal;

b) switching, at a positioning-unit device, spatially distributed elements of said antenna array from a second state to a first state in a predetermined sequence, wherein, in said first state, said elements are configured to transmit a modified positioning signal;

c) applying, in substantial synchronisation with the switching of one of said elements to the first state, a predetermined offset to said positioning signal to create said modified positioning signal;

d) receiving, at a receiver, said modified positioning signal;

e) generating, in a correlator of the receiver, a reference signal for correlation with said modified positioning signal;

f) mixing said modified positioning signal with said reference signal to create a mixed signal; and g) accumulating said mixed signal over an integration period to create an accumulated signal, wherein said accumulated signal is indicative of the direction and magnitude of said beam of said antenna array.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

System Overview

According to the invention, there is provided a device and method for forming a beam of a transmit antenna array in the direction of a positioning receiver. Since the beam of the transmit antenna array is formed remotely by the positioning receiver, the received gain of the incoming positioning signal is maximised while signals from other directions are attenuated, thereby mitigating any unwanted effects of multipath. Depending on the number of elements in the transmit antenna array and their physical distribution, the width of the beam can be made finer such that the positioning receiver only requires a simple omni-directional antenna to achieve an accurate positioning solution. In further embodiments, the present invention can be combined with the disclosure of WO 2011/000049 A1 to form composite beams for even greater positioning solution accuracy.

Figure 1:
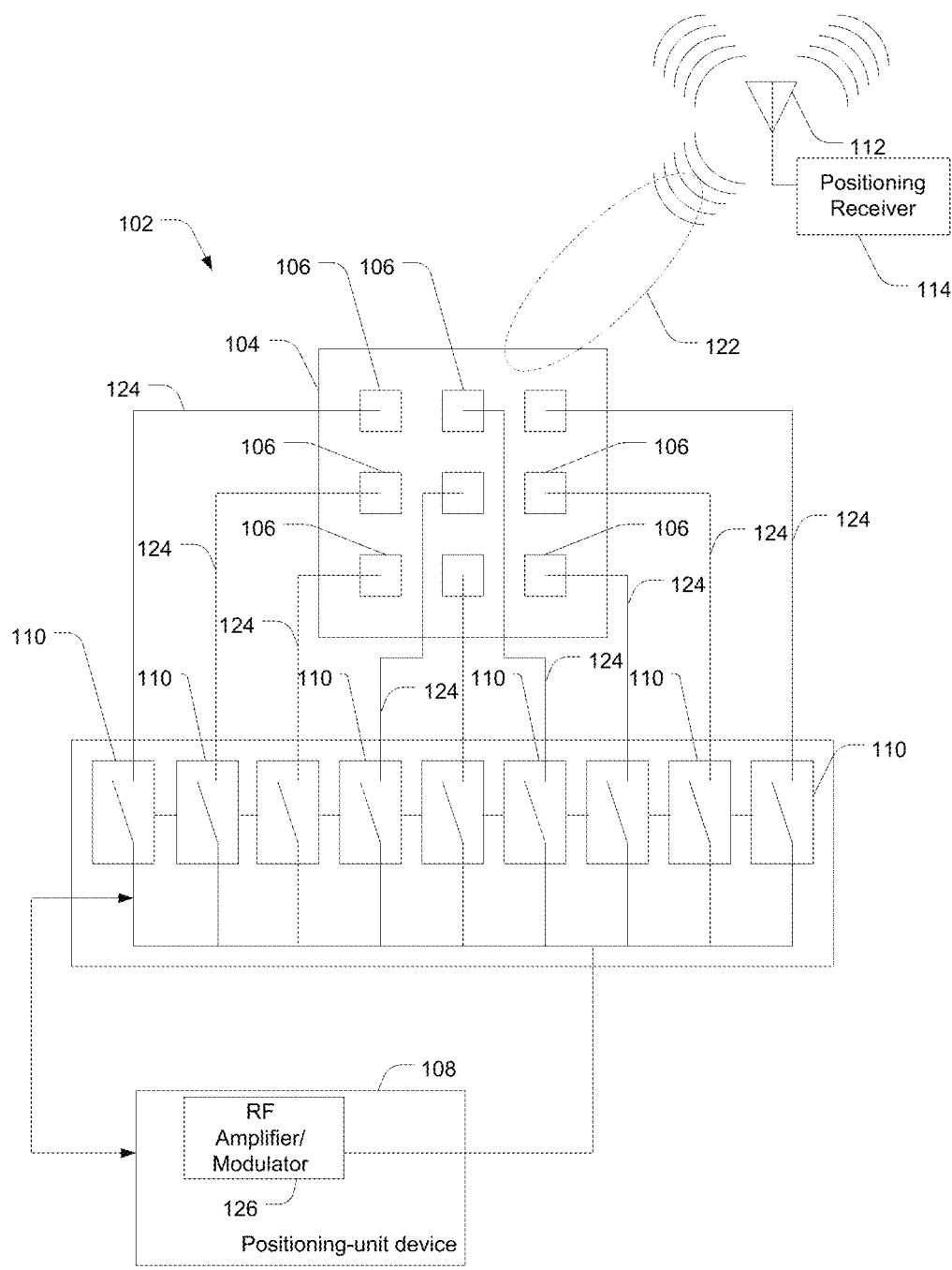
FIG. 1 is a schematic view of an antenna array coupled with a positioning-unit device according to one aspect of the invention.

Referring to FIG. 1, a device 102 for forming remote beams between an omni-directional receive antenna and a transmit antenna array 104 having a plurality of spatially distributed elements 106 is depicted. A positioning-unit device 108 having an RF amplifier/modulator 126 is coupled with the antenna array 104 and is configured to switch the transmit antenna elements 106 between first and second states in a predetermined sequence, wherein, in the first state, the elements 106 are configured to transmit positioning signals; and in the second state the elements 106 are inactive.

A positioning receiver 114 is coupled with, in this case, an omni-directional antenna 112 and is configured to receive the positioning signal from the transmit antenna array 104. The positioning receiver 114 has a processor (not shown) for generating a reference signal, mixing the positioning signal with a modified reference signal to generate a mixed signal and summing the mixed signal over a predetermined period to generate an accumulated signal, wherein the reference signal is modified prior to being mixed with said received signal such that the accumulated signal is indicative of the direction and magnitude of the beam of the transmit antenna array 104.

In some embodiments, discrete components/logic blocks are used in a circuit utilizing mixers, oscillators and accumulators to produce the requisite accumulated signals before passing onto a positioning receiver for subsequent processing. However, the preferred embodiment is to incorporate the beam forming method of the present invention into a standard positioning receiver, such as receiver 114, as much of the required circuitry for forming beams according to the present invention is already part of standard positioning receiver architecture in the form of the correlator, and only requires minor modification to allow the formation of simultaneous beams.

Figure 2:
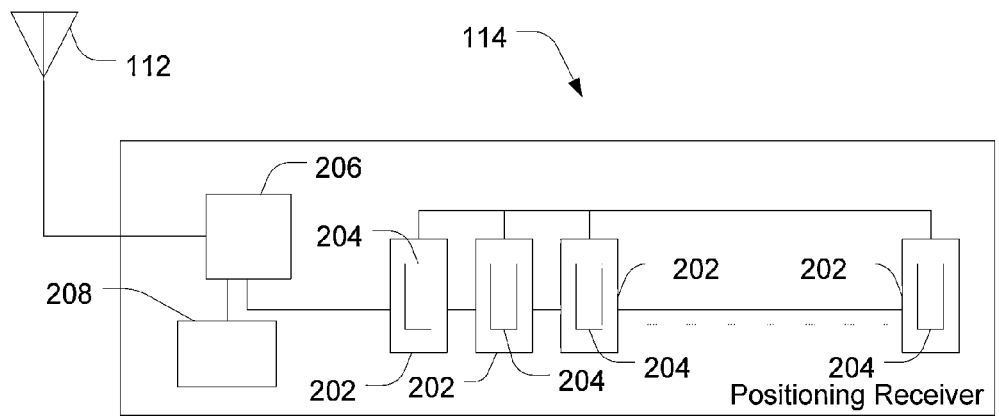
FIG. 2 is a schematic view of the positioning receiver of FIG. 1 coupled to an omni-directional antenna showing some internal components of the receiver according to one aspect of the invention.

FIG. 2 shows schematically the positioning receiver 114 used in a typical positioning network. The positioning receiver 114 makes use of existing components including at least one receive channel 202 having at least one correlator 204 that is in communication with the processor 206. Each correlator 204 incorporates a carrier numerically controlled oscillator (NCO) for generating a reference signal. The phase and/or gain of this reference signal is modified by the processor 206 in substantial synchronism with the element switching sequence of the received positioning signal, thus creating a modified reference signal. The received positioning signal is subsequently mixed with this modified reference signal to create a mixed signal. This mixed signal is then mixed with a code NCO reference signal, as per standard correlator processing, and subsequently accumulated over a predetermined integration period to create an accumulated signal. The resulting accumulated signal is therefore indicative of the direction and magnitude of the beam 122 (shown in FIG. 1) formed within the correlator 204 from the transmit antenna array 104. At the end of each predetermined integration period the tracking loops of the correlator operate as per normal correlator operation, unperturbed by the phase and/or gain manipulations.

The beam of the antenna array can be formed remotely in one of two ways. According to one embodiment, the positioning-unit device 108 is equipped with the logic to manipulate the phase and/or gain of the transmitted signal directly. In this embodiment, the phase and/or gain offsets are applied directly to the transmitted positioning signal in synchronism with the switching of the elements 106 to the first state. For example, when the first element is switched to the first state, the applicable phase and/or gain offsets are calculated and used to manipulate the positioning signal before the signal is transmitted via the first element. When the second element is switched to the first state, the next set of phase and/or gain modifications is applied to the positioning signal before the signal is transmitted by the second element, and so on for the rest of the elements. However, although the phase and gain modifications are applied by the positioning-unit device 108, it is important to note that the beam 122 is not formed until the signal is received by the positioning receiver 114 and is accumulated for an integration period equivalent to the time that elements of the transmit array are switched according to the predetermined switching sequence. Therefore, beam 122 is still, in effect, formed "remotely" by the positioning receiver 114.

This method, however, is unsuitable for positioning systems because it is necessary for signal sources to be multiple access. That is, in a positioning network, there can be an unlimited number of positioning receivers all configured to receive signals from a signal source. By forming a transmit beam to one particular positioning receiver, other positioning receivers within the positioning network are then indefinitely denied access to that signal source.

However, the preferred method for remotely forming beams is to switch the transmit antenna elements in a predetermined switching sequence, but not to change phase and/or gain at the transmit end. Changes to the phase and/or gain are made at the positioning receiver end by synchronously manipulating the reference signal synthesised by the carrier NCO in each correlator channel. In this way, all positioning receivers within the network obtain the same switched, but non-modified, signals from the signal source. However, what is modified is simply the positioning receiver's internal "copy" of the positioning signal. This allows a plurality of positioning receivers to form independent beams from a single transmitter, thus creating a multiple access system. As this is the preferred method of remotely forming beams, this is the method that will be discussed more fully herein.

Modification of the Reference Signal

After the reference signal is synthesised by the carrier NCO, it is modified by selectively manipulating the phase and/or gain of the reference signal in substantial synchronism with receipt of the positioning signal. Specifically, the manipulation of the phase and/or gain is achieved by applying a phase and/or gain offset to the reference signal, wherein the value of the phase and/or gain offset is calculated in dependence upon the predetermined sequence that the elements 106 of the transmit antenna array 104 are switched between the first and second states.

The transmit antenna array 104 is operatively associated with the correlator 204 through synchronous insertion of the respective phase and/or gain offset within the correlator circuit. The operation of the correlator and the insertion of the phase and gain offsets are described in further detail below, with reference to FIG. 6.

Referring again to the embodiment of FIG. 2, the value of the phase and/or gain offset is determined by retrieving a predetermined value stored in a database 208 that is accessible by the processor within the positioning receiver. An offset table, such as the table shown in the illustrative example below, is stored in the database 208 and selectively accessible by the processor 206. Although a stored database of predetermined offset values for a known distribution of antenna elements is illustrated, this is not necessarily the preferred method. It will be understood by those skilled in the art that in alternative embodiments, the phase and/or gain offsets are calculated in real time by the processor 206, utilizing an a-priori model of the antenna array. That is, using the known distribution of antenna element positions to calculate the requisite phase and/or gain to produce the required beams.

Antenna Elements

In the embodiments shown in the various figures, patch elements are depicted in a 3×3 array. However, it will be understood by those skilled in the art that in other embodiments, monopoles, dipoles or other suitable antenna elements are utilised. It will be further understood that the disclosure herein applies equally to antenna elements deployed in antenna arrays having multiple dimensions. In fact, in many practical applications, antenna elements are spatially distributed in a three-dimensional shape.

Throughout this specification and in the claims, the "first" state refers to when an element is active and the "second" state refers to when an element is inactive. The actual implementation of the inactive state varies depending on the type of element used, with the focus placed on making elements non-resonant to mitigate the effects of parasitics or mutual-coupling. For example, a ¼λ monopole element is switched to open in the second state while a patch element is switched to ground in the second state. In some embodiments, the switches also provide a connection to a resistance, such as 50Ω in the second state. It will be appreciated by those skilled in the art that switching to other conditions, such as reactive loads, are also possible in the second state.

Beam Forming Slots

In the preferred embodiment, only one element 106 is in the first state at a time during the predetermined integration period of the positioning receiver, while all other elements are in the second state. That is, for each beam formed at the completion of the predetermined integration period of the positioning receiver, each element 106 has transmitted at least once within the integration period. Each element 106 is switched to the first state for the duration of a sub-integration period, which is less than the predetermined integration period. In one embodiment, these sub-integration periods are known as "remote beam forming slots" (R-slots).

Figure 4A:
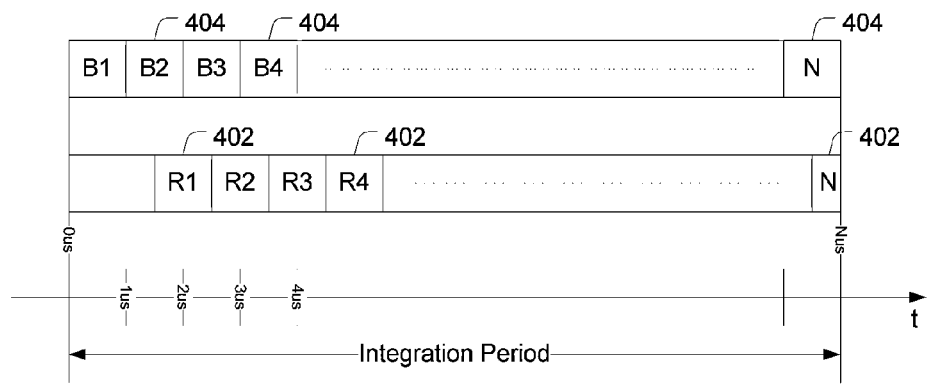
FIG. 4a is a timing diagram showing the relationship between B-slots, R-slots and the integration period according to one aspect of the invention.

The relationship between R-slots and the integration period is best shown in FIG. 4a, which shows R-slots 402 that are each 1 μs in length and the integration period is Nμs long. In essence, the length of the integration period is simply divided into a number of R-slots equal to the number of elements on the antenna arrays. Although preferred, it should be noted that there is no requirement that the R-slots be of equal length, or that only one element is switched to the first state at one time. An R-slot is therefore simply a period of time, during which the positioning receiver 114 is configured to receive a positioning signal transmitted from any element in the transmit antenna array 104 that is switched to the first state. The signal segment within the R-slot is manipulated by the positioning receiver by modifying it with a predetermined phase and/or gain offset, before all the R-slots are accumulated at the end of the integration period to form a beam.

In one embodiment, the minimum number of required R-slots corresponds to the number of elements 106 that are spatially distributed on the transmit antenna array 104. For example, in an implementation where the antenna array only includes two elements, the minimum number of required R-slots is two. When an element 106 is switched to the first state, the receiver is configured to receive the transmitted positioning signal for the entire duration of the allocated R-slot.

In a further embodiment, ten elements are spatially distributed in a transmit antenna array and ten R-slots are provided, one for each element. Using an integration period of 1000 μs, which is a typical integration period of a standard GPS receiver, elements are switched to the first state for a period of 100 μs each, in a predetermined sequence (such as sequentially or pseudo randomly). The positioning-unit device 108 switches the first element to the first state and begins transmitting the positioning signal. Once the positioning receiver 114 receives the transmitted signal, and synchronisation to the transmitted R-slots has occurred, the processor 206 determines the phase and/or gain offset that needs to be applied to the reference signal, which corresponds to the first element's position within the transmit antenna array 104 and the direction of the beam required by the positioning receiver 114. The offsets are then applied to the reference signal for the entire duration of the first allocated R-slot. In the subsequent 100 μs R-slot, the positioning-unit device 108 switches the second element to the first state while the first element and all the other elements are switched to their second states. Again, the processor 206 of the positioning receiver 114 determines the phase and/or gain offset corresponding to the second element's position within the array and the direction of the beam required by the positioning receiver, and applies that phase and/or gain offset for the entire duration of the second R-slot. In this example, which uses a sequential switching scheme, the positioning-unit device then switches the third element to the first state while the other elements are switched to their second states for the third R-slot, and so on for the subsequent elements and R-slots within that integration period. At the completion of the 1000 μs integration period, all ten 100 μs R-slots will be accumulated with the requisite phase and/or gain offsets to produce the desired beam required by the positioning receiver.

It should be noted that the positioning-unit device 108 is physically separate from the positioning receiver 114, and therefore the individual elements 106 in the transmit antenna array 104 cannot directly access the receiver 114. However, the positioning receiver 114 knows, a priori, the sequence in which the elements 106 in the transmit antenna array 104 will be switched to the first state, the distribution of elements within the transmit array, and the orientation of the transmit array. In the preferred embodiment transmit array information, incorporating the antenna element switching sequence and the geographical position of each individual antenna element, is broadcast from each positioning-unit device to all positioning receivers in-view. In substantial synchronism with the positioning receiver 114 receiving the transmitted positioning signal R slots, the phase and/or gain of the reference signal is manipulated as appropriate in order to form the beam in the desired direction. Also, in order to obtain the full benefit of the allocated R-slot, it follows that the phase and/or gain manipulation must be applied to the reference signal throughout the entirety of the allocated R-slot.

As the positioning receiver 114 controls the direction of the beam formed by the transmit antenna array 104, this method of beam forming is termed "remote beam forming", and the slots used to accumulate the transmitted positioning signals are known as R-slots.

In addition, and as discussed in WO 2011/000049 A1, it is also possible for the positioning receiver 114 to be configured to form "local" beams using a receive antenna array that is directly connected to the positioning receiver 114. This works in a similar fashion to remote beam forming, but with a significant difference. In remote beam forming, the positioning receiver 114 synchronises R-slot switching of each correlator channel independently, the timing of this synchronisation being dependent on the distance of the positioning receiver from each transmitter. In local beam forming, the positioning receiver directly controls the switching of the elements in the receive antenna array. As an element is switched to the first state, the positioning receiver simultaneously manipulates the phase and/or gain of each reference signal across all correlator channels and, once mixed and accumulated, a unique receive antenna beam is formed in each correlator. Again, the integration period for local beam forming is divided into slots called "beam forming slots" or B-slots.

Figure 3:
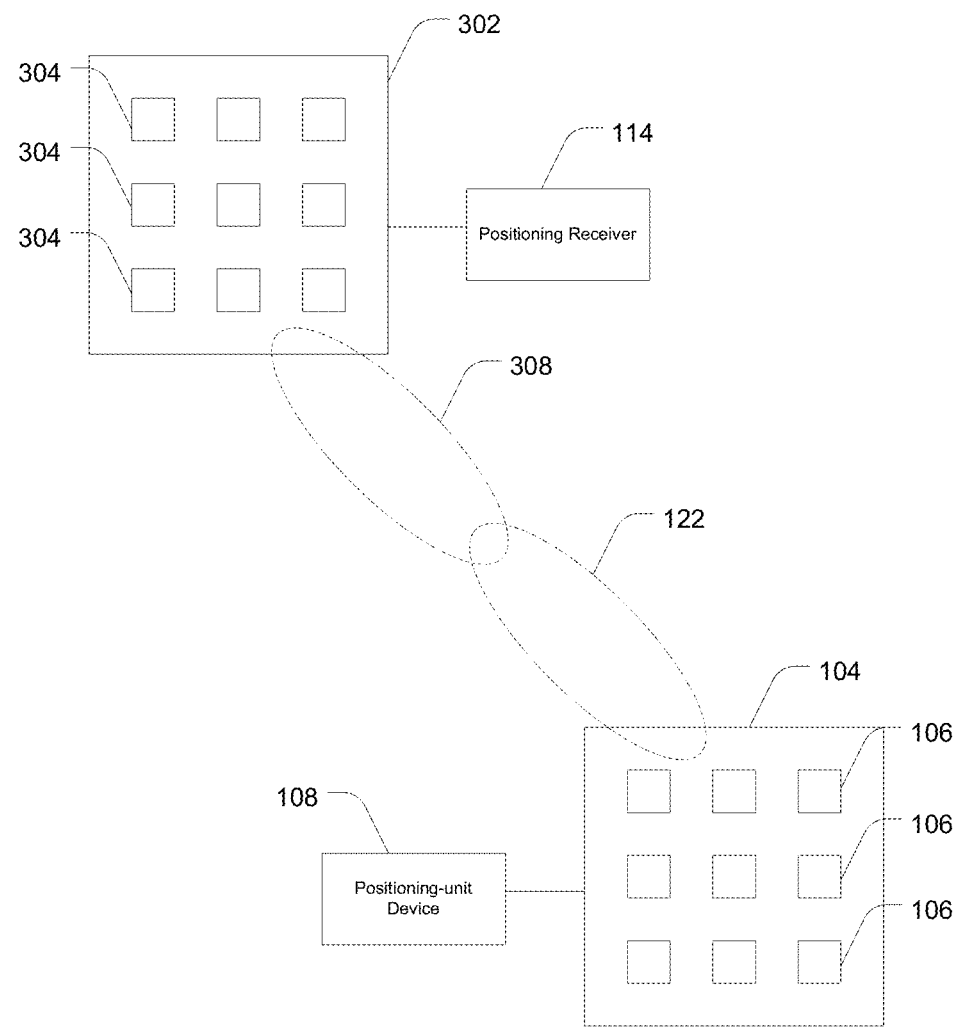
FIG. 3 is a schematic view of a beam locally formed by the positioning receiver interacting with a beam remotely formed by the antenna array of FIG. 1.

It follows therefore, that both local and remote beam forming methodologies may be combined to form composite beams to provide an accurate position solution. This is best shown in the embodiment of FIG. 3, in which the positioning-unit device 108 is coupled with a transmit antenna array 104 as previously discussed. The positioning receiver 114 is also coupled to a receive antenna array 302 which, in this case comprises patch elements 304 configured in a 3×3 matrix similar to the transmit antenna array 104. Transmit beam 122 and receive beam 308 are formed such that they track each other, as shown, providing, in essence, a point-to-point communication link between the positioning receiver 114 and the positioning-unit device 108.

In this embodiment, both remote and local beams are formed in the correlator of the positioning receiver 114. As best shown in FIG. 4a, the integration period is divided into both B-slots 404 and R-slots 402, where some R-slots 402 may overlap B-slots 404. Therefore, in some instances, the phase and/or gain of the reference signal may be modified both in connection with the current active B-slot 404 and in connection with the current active R-slot 402 to give the required composite beam. This is because the B-slot manipulation is triggered directly by the positioning receiver 114 when an element in the local receive antenna array is switched to the first state while the R-slot manipulation is triggered independently across each channel according to the received R-slot timing, and in conjunction with the predetermined switching sequence of the transmit antenna array 104. This timing is affected by individual propagation delays between each transmitter and the positioning receiver.

Figure 4B:
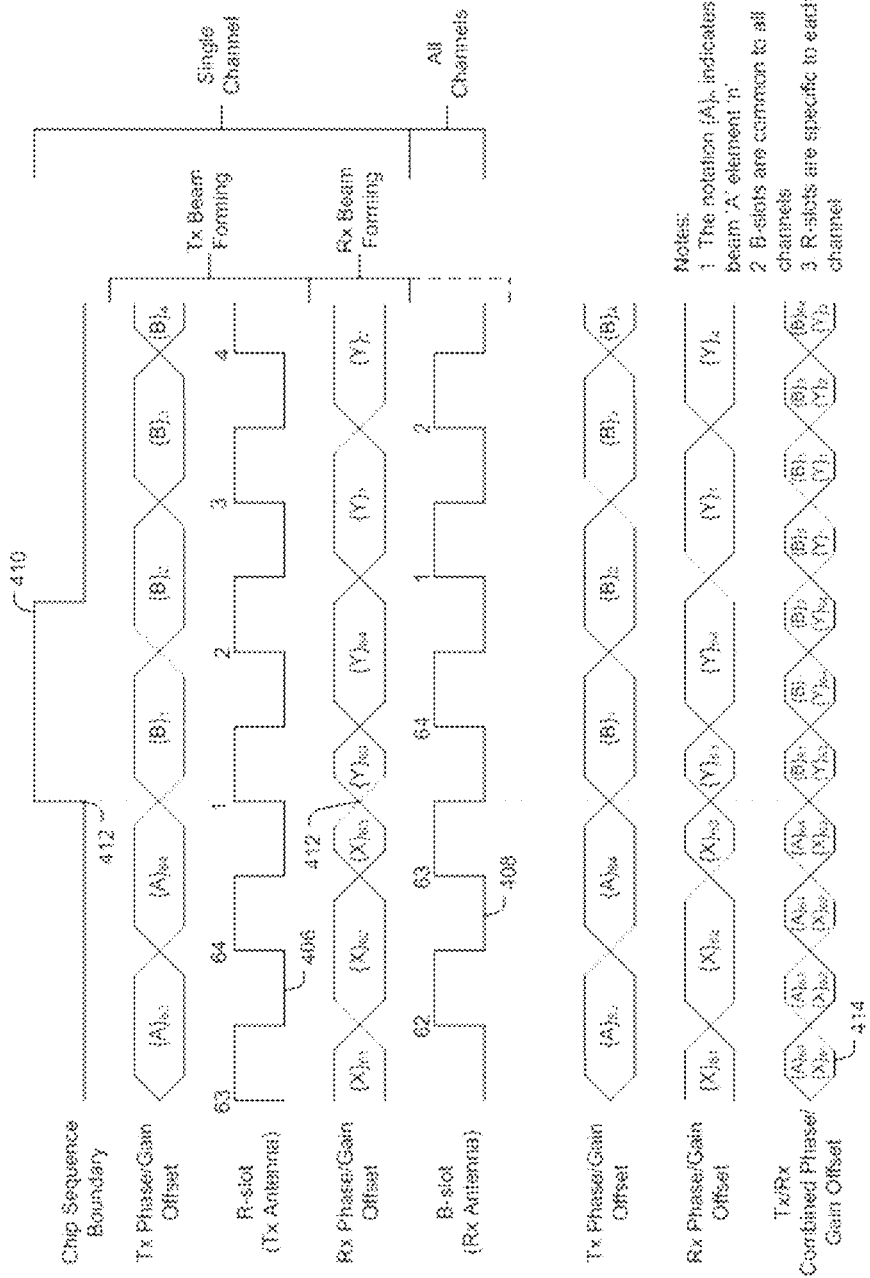
FIG. 4b is a timing diagram showing in more detail the relationship between B-slots, R-slots and how phase and/or gain offsets are applied to the reference signal according to one aspect of the invention.

The process of forming composite beams is best shown in the embodiment of FIG. 4b, which is a timing diagram for a hypothetical positioning system using 64 element antenna arrays on both the transmit side and on the receive side. First, note that R-slots 406 are unique to a single channel, while B-slots 408 are common across all channels. This is because, as discussed above, R-slots are triggered independently across each channel whereas all B-slots are triggered at the same time by the positioning receiver as elements in the receive antenna array are switched to the first state.

Referring to the transmit antenna array, as the chip sequence boundary 410 ticks over, at point 412, element 1 of the transmit antenna is switched to the first state, and begins transmitting the positioning signal segment to form the next beam (denoted "beam B" in FIG. 4b). At this point, the first R-slot begins, and the R-slot sequence for this channel is synchronised from point 412 onwards. As shown in FIG. 4b, the phase and/or gain offset that is applied to the reference signal for the first R-slot for beam B is denoted $\{B\}_1$.

Concurrently and, asynchronously, to the R-slot sequence, the receive antenna array is also switching B-slots. Just prior to point 412, the receive antenna array is forming a beam (denoted "beam X") and is receiving a signal from element 63 of the receive antenna array; the offset being applied to the reference signal in respect to the received signal is denoted $\{X\}_{63}$. At point 412, the positioning receiver updates the remote transmit beam look-angle from "beam A" to "beam B", and the local receive beam look-angle from "beam X" to "beam Y". This causes the positioning receiver to stop applying the remote transmit phase and/or gain offset denoted by $\{A\}_{64}$ to the reference signal and start applying the phase and/or gain offset denoted $\{B\}_1$ to the reference signal. Concurrently, the positioning receiver stops applying the local receive phase and/or gain offset denoted by $\{X\}_{63}$ to the reference signal and starts applying the phase and/or gain offset denoted $\{Y\}_{63}$ for the rest of the $63^{rd}$ B-slot to the reference signal. The positioning receiver then continues switching the elements of the receive antenna array according to the predetermined sequence, but is now forming local beam Y through the application of the phase and/or gain offsets denoted $\{Y\}_n$ to the reference signal, and forming remote beam B through the application of the phase and/or gain offsets denoted $\{B\}_n$ to the reference signal.

In the preferred embodiment, the R-slot and B-slot phase and/or gain offset values are combined (preferably, the phases are summed and the gains are multiplied), as shown in the RX/TX Combined Phase/Gain Offset 414. The combined offset value is then applied to the reference signal to form composite beams between the transmit antenna array and the receive antenna array as best shown in FIG. 3.

Synchronisation

For local beam forming, each element of the receive antenna array is connected to a respective switch, which in turn feeds into a single RF frontend to be downconverted and sent to the correlator. Generally, transmission lines that interconnect the elements and the switches are of equal length, to ensure received signals are phase coherent through the antenna array feed system. However, in some embodiments, differences in the lengths of the transmission line are taken into account and corrected at the time of applying the phase and/or gain offsets.

The interconnection between the receive antenna array and the positioning receiver, as well as the RF frontend, the electronics involved in the correlator and the actual switches themselves, will inevitably cause delays. In one implementation, this delay is measured to be around 950 ns, but of course, those skilled in the art will appreciate that the length of the delay will vary depending on the selected hardware. Therefore, operation of the phase and/or gain manipulation in the correlator cannot occur simultaneously with the switching of the element to the first state, as this delay must be accounted for. That is, the manipulation of the phase and/or gain in the correlator must be delayed by up to 950 ns in this embodiment.

In a physical implementation, the receive antenna array contains 64 elements with an integration period of 100 μs. Therefore, the period of a B-slot is in the region of just 1 μs or 2 μs and, as such, a delay of nearly 1 μs is significant and must be accounted for.

Therefore, for local beam forming, the first B-slot of the integration period for each correlator 204 of the positioning receiver 114 are updated simultaneously and triggered to start after taking this 950 ns delay into account.

However, for remote beam forming, each correlator starts asynchronously as each correlator is individually updated and triggered based on when the positioning signal is received. That is, the synchronisation process required for remote beam forming is markedly different from the synchronisation required for local beam forming.

The positioning-unit device 108 switches an element to the first state which then begins transmitting the positioning signal. The positioning receiver must be synchronised so that it manipulates the phase and/or gain of the reference signal as the element 106 is switched to the first state, taking into account propagation and receiver delays before the signal is received in the correlator. In addition, there is a transmission delay that occurs between when the positioning signal is generated and when it is transmitted through the antenna, which is primarily introduced by the RF modulator/amplifier 126. In practice, this transmission delay is similar to that incurred in the receiver and is usually around 950 ns.

In the preferred embodiment, the chip sequence of the pseudorandom code (PRN) generator of the positioning-unit device is used as a quasi-timer to trigger the R-slot sequence. This method has the additional benefit of negating the effects of the propagation and receiver delays, but the transmitter delays must still be accounted for.

For this embodiment, it is assumed that the positioning receiver 114 knows, a priori, the switching sequence of the transmit antenna array 104, the type of antenna array 104 that is coupled to positioning-unit device 108, as well as the antenna array 104 position and orientation. This information therefore provides the precise geographical co-ordinates of each individual antenna element to the positioning receiver 114.

In a positioning-unit device, the PRN code is a random but finite binary sequence, which is unique for every positioning-unit device and, in this embodiment, is 1023 chips long. That is, the PRN code repeats every 1023 chips for a given positioning-unit device 108. Since the positioning receiver knows that the received positioning signal will be 1023 chips long, it can define R-slot durations with reference to a chip period.

For example, if the transmit antenna array consists of 50 elements, and the sequence length of the PRN code is 1023 chips, then an R-slot, in this embodiment, is defined as a period of time within the integration period equivalent to 20 chips (rounded down to the nearest integer). Furthermore, the elements 106 are configured to switch states, in a predetermined sequence, in synchronism with a boundary chip of an R-Slot.

For example, assume that elements 106 are set to switch in a sequential switching sequence starting from element 1 and that chip 1 of the PRN code is set to be the beginning of the first R-slot. When chip 1 of the next integration period ticks over, the positioning-unit device 108 switches element 1 to the first state and begins transmission of the positioning signal. Similarly, when the $21^{st}$ chip ticks over the second R-slot begins and the positioning-unit device 108 switches the element 2 to the first state while switching element 1 and the other elements to the second state. At the $41^{st}$ chip the third R-slot begins and element 3 switches to the first state, and so on for all the rest of the elements.

As explained in more detail below, once the positioning receiver 114 receives the positioning signal, it correlates the received PRN code sequence against an internally generated PRN code sequence, thus bringing the internally generated code sequence into alignment with the received PRN sequence. Therefore, the positioning receiver 114 is also configured to "count" the chips in the code sequence to determine the boundary chip that triggers the next R-slot.

Knowing the current R-slot, and the associated element in the transmit antenna array 104 that is switched to the first state, the positioning receiver 114 can then calculate the appropriate phase and/or gain offset value to apply to the reference signal so as to obtain the desired direction to in which point the beam 122 at the end of the integration period.

Beam Forming Methodology

Figure 5:
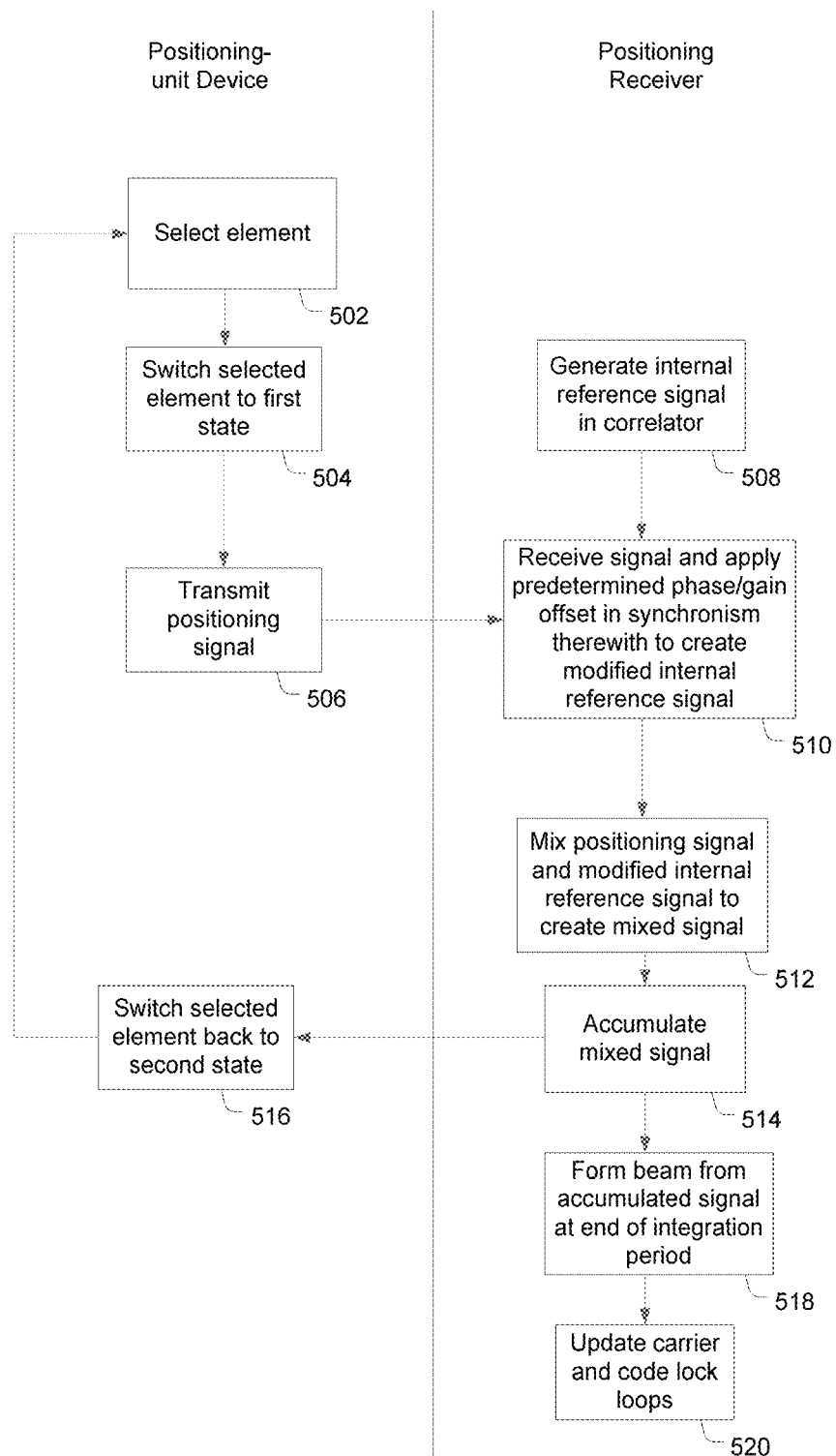
FIG. 5 is a flow diagram of the steps involved for remotely forming beams according to one aspect of the invention.

The steps followed to form beams using the device disclosed herein are graphically represented in the flow diagram of FIG. 5. A description of the steps taken is provided below.

a) At step 502, one of the spatially distributed elements in the transmit antenna array is selected.
b) At step 504, the element selected at step 502 is switched to the first state.
c) At step 506, the element switched to the first state at step 504 begins transmission of the positioning signal in a predetermined R-slot.
d) At step 508, an internal reference signal, based on the known PRN code sequence to be received, is generated in the correlator for mixing with the incoming positioning signal.
e) At step 510, a predetermined offset is applied to the reference signal, in substantial synchronisation with the currently received predetermined R-slot positioning signal, to create a modified reference signal.
f) At step 512, the modified reference signal is mixed with the received positioning signal to create a mixed signal.
g) At step 514, the mixed signal is accumulated in the accumulators to create an accumulated signal.
h) At step 516, the selected element is switched to the second state, the next element is switched to the first state in the next R-slot and the process starts again from step 502.
i) At step 518, after accumulating all the R-slots together at the end of the integration period, a beam is formed in the accumulators based on the value of all the R-slot signals.
j) At step 520, the carrier and code lock loops are updated using the accumulated R-slot signals.

Correlator Operation

Figure 6:
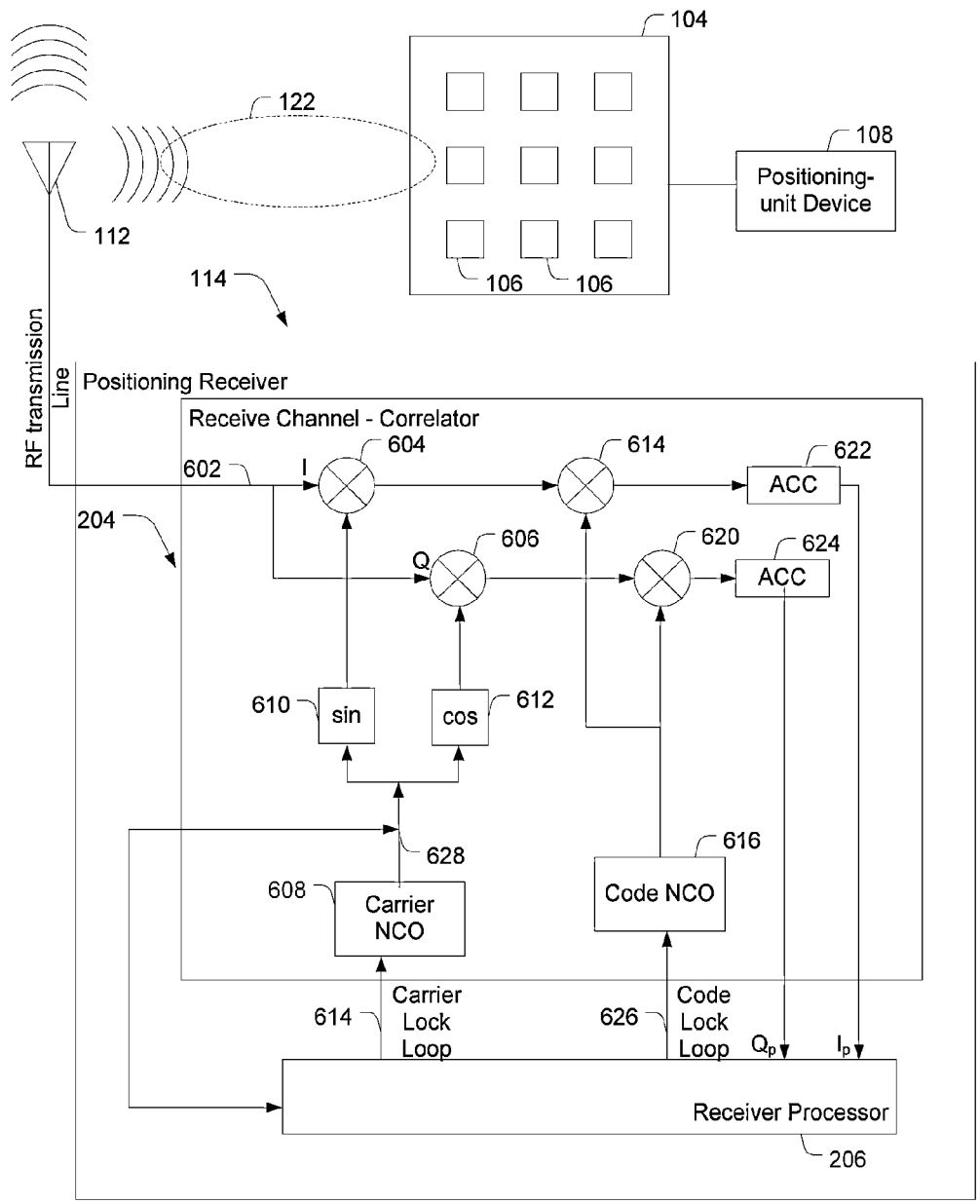
FIG. 6, is a schematic view of a modified correlator according to one aspect of the invention.

A GPS position receiver typically uses a logic block called a correlator to correlate an incoming positioning signal with internally generated reference signals. Referring to FIG. 6, in the correlator 204, an incoming positioning signal is mixed with two internally generated reference signals. The first reference signal is a carrier reference signal that is generated by the carrier NCO 608. Mixing the carrier reference signal with the incoming positioning signal generates an error signal representing a phase and frequency difference between the carrier reference signal and the incoming signal. The second reference signal is a code reference signal that, in this embodiment, is generated by the code NCO 616. Once the incoming positioning signal has been mixed with the carrier reference signal, the incoming positioning signal is mixed with the code reference signal, which generates an error signal representing the time delay between the code reference signal and the incoming positioning signal.

For simplicity, FIG. 6 only shows a single receive channel of a positioning receiver. However, those skilled in the art will appreciate that modern receivers typically include more than a single receive channel, with each channel typically including more than one correlator.

In FIG. 6, the incoming positioning signal is received at the input 602 and stripped of the carrier component by mixing, in mixers 604 and 606, the incoming signal with a reference carrier signal to produce in-phase (I) and quadra-phase (Q) sampled data. The reference carrier signal is synthesised in the carrier NCO 608 and the discrete sine and cosine mapping functions 610 and 612 respectively. This stripping process produces I and Q signals as shown. In operation, the carrier NCO is controlled by the carrier lock loop 614. The objective of the carrier lock loop is to keep the phase error between the reference signal generated by the Carrier NCO and incoming positional signal at, or as close as possible to, zero. When the phase error is zero, the signals are said to be "phase-locked" and the I signals are at a maximum while the Q signals are nearly zero. This operation is also called "phase lock loop" (PLL) operation.

The I and Q signals are then correlated with a reference code signal that, in this embodiment, is synthesised in the code NCO 616. For the sake of simplicity, only one reference code signal is synthesised in this embodiment. However, those skilled in the art will recognise that in most positioning receivers, more than one code reference signal is synthesised. For example, in one application, three code reference signals—early, prompt and late signals—are synthesised and separately correlated with the I and Q signals respectively.

The correlator 204 mixes an internally synthesised code reference signal with the incoming I and Q signals in the mixers 614 and 620. In operation, the code NCO 616 is controlled by the code lock loop 626. The objective of the code lock loop is to keep the time error between the internally generated code reference signal and incoming code positioning signal at, or as close as possible to, zero. When the time error is zero, the signals are said to be "code-locked". This operation is also called "delay lock loop" (DLL) operation.

That is, the operation of the code lock loop 626 is similar to the carrier lock loop 614. When the reference signal code phase is completely aligned with the incoming positioning signal code phase, maximum correlation is attained.

The resultant mixed signals are then integrated in the accumulators 622 and 624 over an integration period, providing $I_p$ and $Q_p$ signals, which are subsequently accessed by the processor 206 for tracking loop operation.

The integration period refers to the length of time over which the received signal is accumulated, and is traditionally determined based on a satellite's pseudorandom code noise length or multiples thereof. In GPS, this code period is 1 ms, and thus the integration period in the receiver is also often set to 1 ms or more.

Phase and/or Gain Offsets

In a preferred embodiment, phase and/or gain offsets for manipulating the phase and/or gain of the transmitted positioning signal is inserted at point 628, after the carrier reference signal is synthesised by the carrier NCO 608 and before the synthesised carrier reference signal is mixed with the carrier component of the incoming positioning signal, completing the carrier lock loop 614. In this preferred embodiment the phase offsets are summed with the synthesized carrier reference signal, and the gain offsets are multiplied with the synthesized carrier reference signal. Manipulation of the incoming positioning signal is achieved by modifying the synthesised carrier reference signal within the integration period of the correlator, therefore not interfering with the normal operation of the carrier NCO 608 or the carrier lock loop 614. The modified reference signal is then mixed with the incoming positioning signal in the usual manner, and the mixed signal is integrated in the accumulator over the integration period to create an accumulated signal.

As known by those skilled in the art, the integration of a waveform is simply the summation of samples of that waveform over a given period of time, in this case, the integration period. Therefore, the integration of the resultant mixed signal (resulting from mixing the incoming signal and the reference signal) is simply the summation of samples of that signal over a period of time—which in one of the embodiments described above is the integration period of 1 ms.

In one embodiment, the positioning signal is received at a rate of 75 MHz and the samples are then mixed with a modified reference signal, which is also synthesised at 75 MHz. Consequently, for a hypothetical system in which the integration period is 1 ms comprised of 10 R-slots, each R-slot is of 100 μs in duration and therefore contains 7,500 samples of the incoming positioning signal. Each one of these 7,500 samples is sequentially mixed with a modified reference signal to form a mixed signal. The modified reference signal is based on a phase and/or gain offset applied to a reference signal, the reference signal being generated by the carrier NCO of the correlator.

Specifically, for each block of 7,500 samples of the incoming positioning signal, which are synchronized with antenna elements being in the first state, the reference signal is modified by applying a phase and/or gain offset to the output of the carrier NCO. This modified output is then multiplied (mixed) with the incoming positioning signal samples. These mixed signals are then passed through the code NCO mixers, as per normal correlator operation, and then summed in the accumulators to form an accumulated signal. Therefore over the entire integration period of 1 ms, 75,000 samples, incorporating ten R-slot blocks of 7,500 modified samples each, are summed and stored in the accumulators. In other words, these ten R-slots contain 7,500 modified samples each of which are summed together in the accumulation process, and the 75,000 accumulated samples at the end of the integration period are therefore representative of the desired beam 122. As shown in FIG. 6, the desired beam is pointed in the direction of omnidirectional antenna 112 which is coupled with the positioning receiver 114.

Once the phase and/or gain manipulations are correctly applied to the reference signals and mixed with the signals received from the respective elements, the resultant mixed signal is then combined in the accumulator (the summing process) to create an accumulated signal, forming the desired beam in the correlator. This accumulated signal is then processed in the correlator as per normal PLL operation as discussed above. The carrier reference signal synthesised by the carrier NCO 608 does not change during the integration period, but is only updated by the carrier lock loop 614 at the end of each integration period. Therefore, phase and/or gain modifications to the reference signal within the integration period are applied against a common carrier NCO 608 value, and cannot be detected by the PLL or the DLL. The PLL and DLL operate as per normal, unaware of the manipulations taking place.

Through the embodiments described, the use of a conventional correlator is adaptable to control the direction and the width of a unique beam per correlator channel, thereby allowing multiple simultaneous beams to be formed. The number of beams able to be formed is equal to the number of correlator channels available. This is because the correlator already contains logic for mixing and integrating signals—these are simply adapted for a use other than correlating.

Although the embodiments described above apply offsets to both the gain and the phase at point 628 in the correlator circuit, in other embodiments, additional multipliers for applying gain offsets are provided in other parts of the circuit. For example, multipliers can be added in the In-phase and Quadra-phase paths between the carrier NCO mixers and the code NCO mixers to provide gain manipulation. Similarly, phase offsets can also be applied at other parts in the correlator circuit. For example, phase offsets can be added to the output of the code NCO.

In the preferred embodiment, the phase and/or gain offsets for forming the transmit beam 122 (of FIG. 3) in any given direction are calculated in hardware as and when required. The processor 206 of the positioning receiver determines the direction of the required beam, and calculates the correct phase and/or gain offsets for each element in each R-slot over the integration period to form the beam in the desired direction, and inserts the necessary offsets at point 628 such that the beam is formed in the direction of the positioning receiver 114. As also noted, obtaining and inserting the phase and/or gain offsets for the transmit beam must be substantially synchronous with the receipt of the R-slots so that the phase and/or gain is correctly manipulated over the integration period.

Similarly, the phase and/or gain offsets for forming the local receive beam 308 (of FIG. 3) in any given direction are also calculated. The processor 206 determines the direction of the transmit beam 122, calculates the correct phase and/or gain offsets for each element of the receive antenna array 302 (of FIG. 3) in each B-slot over the integration period to form the receive beam 308 in the direction corresponding to the transmit beam 122, and inserts the necessary offsets at point 628 such that the beams are formed in the appropriate direction. Obtaining and inserting the phase and/or gain offsets for the receive beam 308 must be substantially synchronous with the switching of the respective elements 304 of the local antenna array into the first state so that the phase and/or gain is correctly manipulated over the integration period.

In other embodiments, the phase and/or gain offsets for forming both the remote transmit beam 122 and the local receive beam 308 in any given direction are predetermined, and stored in the database 208 (of FIG. 2) and is accessible by the processor 206. The format of the offset data can take many forms, such as in an offset table. The processor 206 determines the direction of the required beams, accesses the database 208 to obtain the correct phase and/or gain offsets for each element over the integration period to form the beams in the desired directions, and inserts the necessary offsets at point 628 such that the beams are formed in the appropriate direction.

The number of elements that the antenna array contains is one criterion for forming narrow beams. Other, equally important criteria include the speed of the calculation of the phase and/or gain offsets and the physical spacing of the elements. For example, in embodiments having 60 elements, each direction in which a beam is to be formed must have 60 gain offsets and 60 phase offsets, which in this embodiment are calculated in real time in hardware.

The physical separation of the elements is also important so as to create a phase difference between the elements. Effectively, the physical separation of the elements allows a positioning signal to be transmitted with inherently different phases. One half wavelength separation between elements provides maximum phasing with minimum grating lobes. Manipulation of those phases, for example by mixing with a modified reference signal as noted above, allows for a beam to be formed in a desired direction.

In a particularly preferred embodiment, the elements 106 are spatially distributed in a configuration that is more than two dimensions such that the device can form beams in more than two dimensions. To a large extent, the directions in which a beam can possibly be formed are dependent on the elements used. For example, a planar array consisting of patch elements will be able to form beams hemispherically and a planar array consisting of monopoles will be able to form beams in a plane.

Angle of Arrival Vs Angle of Transmission

Traditionally, angle of arrival solutions work by estimating the angle of a signal arriving at a base station with respect to a reference direction, such as geographic north. A plurality of receive elements are spatially distributed at the base station and phase comparisons performed to determine an angle of arrival of a transmitted signal from a user terminal. If a number of such base stations are available the position of the user terminal can be calculated by the network of base stations, using intersection of angles.

However, this technique only allows the network to perform the position calculation, not the user terminal. The user terminal is unaware of its own position.

However the present invention overcomes this limitation, and makes it possible for the position receiver to calculate its own position using what, for the purposes of this discussion, is termed "angle of transmission". Conceptually, the angle at which a positioning signal is transmitted from a positioning-unit device, if known, can be used in a similar manner to the angle of arrival to calculate the position of the positioning receiver. However, since a positioning signal is typically broadcast so that multiple positioning receivers can access the signal and calculate their respective positions, it is not possible to calculate an "angle of transmission".

In the present invention however, it is possible for the positioning receiver to form a beam from the transmission source directed at the positioning receiver itself. Therefore, with the orientation of the transmission array known a-priori, an angle of transmission can be determined from each transmission source. The position receiver subsequently uses a plurality of geographically distributed signal sources to calculate a position using intersection of angles. Moreover, in one embodiment, the positioning receiver is only equipped with a simple omni-directional antenna. In such an embodiment, it is impossible for the positioning receiver to calculate its position using standard angle methods such as angle of arrival. It must instead rely on the angle of the beam from the transmission source.

An Illustrative Embodiment

Figure 7A:
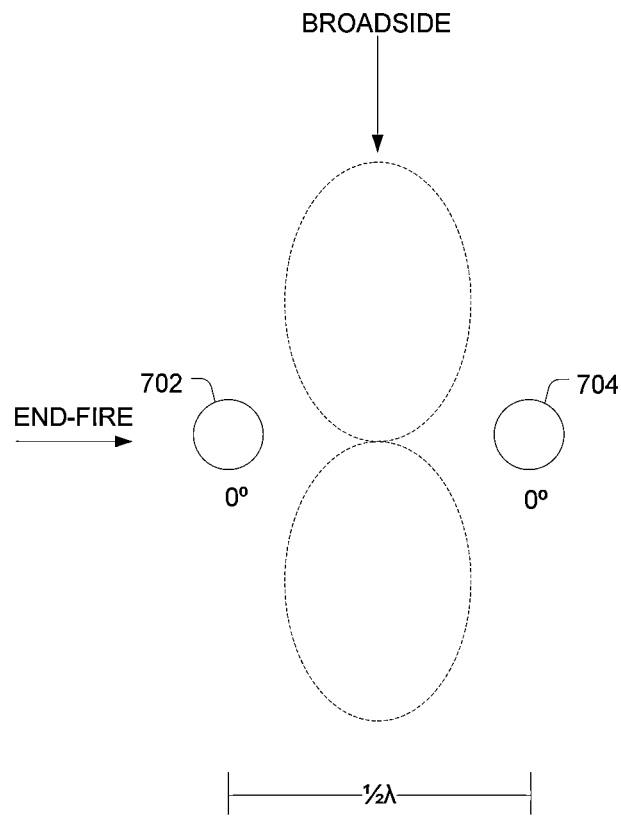
FIGS. 7a and 7b are schematic views of a two-antenna array according to one aspect of the invention.
Figure 7B:
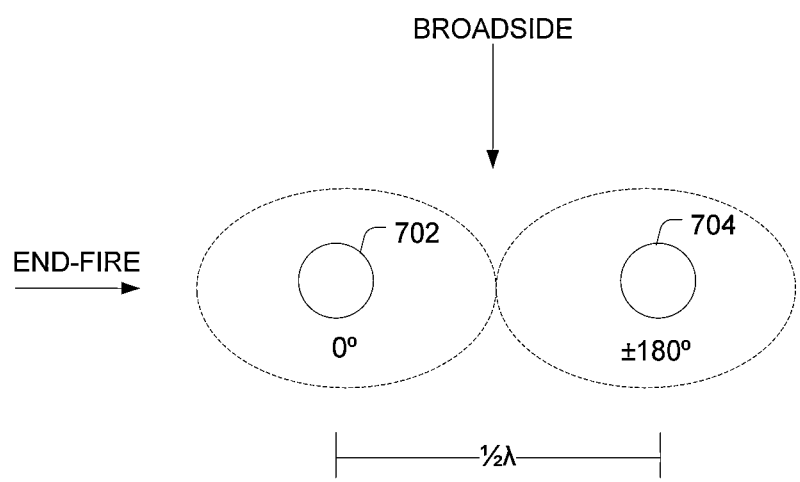

For illustrative purposes, the invention will now be described using the simplest antenna array—an array having only two elements as shown in FIGS. 7a and 7b. However, those skilled in the art would be able to adapt the teachings herein to antenna arrays having many more elements spatially distributed in multi-dimensional shapes without additional inventive faculty.

In this illustrative embodiment, elements 702 and 704 are quarter wavelength mono poles. The two elements are placed a half wavelength spatially apart from each other at known geographical locations and phase coherent signals are transmitted by each element. When the signals transmitted by the two elements are summed together, the respective omni-directional gain patterns of the elements combine such that, from a two dimensional topographical view of the elements, a figure-8 beam pattern is formed, as shown in FIG. 7a. In this configuration, an outgoing positioning signal from the broadside direction of the elements 702 and 704 is in-phase, and hence summed constructively, while signals from the end-fire direction of the elements are out of phase, and hence cancelled.

Phase Manipulation

In the present invention, it is possible to rotate the figure-8 by 90° so that maximum gain is pointed in the end-fire direction, as shown in FIG. 7b. This is achieved by manipulating the phase and/or gain of element 702 and element 704 within an integration period of a position receiver. Element 702 and element 704 are each connected to a switch, so that either element can be switched between first and second states by the positioning-unit device and the integration period over which the summation of the signal occurs is split into two R-slots.

Since the phase separation between elements 702 and 704 is known, the phase of one of the elements can be manipulated so that transmitted waves from the end-fire direction are summed constructively instead of destructively. In this case, because the elements are half wavelength apart, the phase manipulation required at element 704 is 180°. The phase manipulations required for each direction are similarly calculated to construct an offset table. For the sake of simplicity, the gain offset is set at 1 and the direction that the beam can be steered is limited to either the broadside direction or the end-fire direction. An example offset table incorporating these limitations is provided below.

|  | Direction | | | |
|---|---|---|---|---|
|  | Broadside | | End-fire | |
| Element | 702 | 704 | 702 | 704 |
| Phase | 0° | 0° | 0° | 180° |
| Gain | 1 | 1 | 1 | 1 |

To form a beam in the end-fire direction, elements 702 and 704 are switched to the first state in a predetermined sequence. First, at the transmission end, element 702 is switched to the first state and starts transmitting a positioning signal. When the signal from element 702 is received at the receiver end, the first R-slot begins and the phase offset is kept at 0° while being accumulated in the accumulator—no manipulations are necessary because this element is already at 0°. Next, element 704 has a received phase of 180° relative to element 702 in the end-fire direction, and the phase of the positioning signal is desired to sum constructively with element 704 in this direction. Therefore, when the positioning signal is received by the positioning receiver in the second R-slot, a phase offset of 180° must be added to the signal received from element 704, so that the transmitted signal from element 704 becomes phase coherent with element 702. The two R-slots are summed together in the accumulation process and the accumulated value at the end of the integration period is therefore representative of the end-fire beam.

It will be understood by those skilled in the art that in the present invention, the figure-8 beam can be formed in any direction, depending on the complexity of offset table.

For both elements in this simple example, a gain offset of 1 (unity gain) is multiplied with the incoming positioning signal and therefore does not modify the beam formed. Appropriate gain offsets allow modification to the shape of the beam, thus allowing mitigation of grating lobes, which is well known in the art of phased arrays and not a subject of the present invention.

As noted above, the phase manipulation must be applied substantially synchronously to the receipt of the positioning signal from the element being switched to the first state; otherwise the gain pattern of the beam will not be formed correctly.

According to embodiments of the present invention, a positioning signal commences transmission from the first element. After acquisition of this positioning signal by the positioning receiver, a carrier NCO within the positioning receiver correlator synthesises a reference signal that is substantially similar to the positioning signal.

The positioning receiver determines that it is in the end fire direction relative to the positioning-unit device, and therefore a decision is made to form a beam in that direction. The receiver processor calculates and determines that no offset is required for the first R-slot during the integration period, which corresponds to element 702. Similarly, the processor determines that a 180°, or ½λ, offset is required during the second R-slot, which corresponds to element 704. After applying each offset to the carrier NCO to create a modified reference signal, the incoming positioning signal and the modified reference signal are mixed in a mixer and accumulated in the accumulator, as per the normal operation of a correlator.

The received positioning signal is stripped into its in-phase and quadra-phase components, by mixing the received positioning signal with a carrier reference signal that is synthesised by the carrier NCO 608 and the discrete sine and cosine mapping functions 610 and 612, as shown in FIG. 6. Before the modified reference signal is mixed with the received positioning signal, however, the processor determines that the positioning receiver is in the endfire direction of the positioning-unit device. For the first R-slot, which corresponds to the time that the positioning receiver receives the positioning signal from element 702, the processor calculates that an offset is not required and so no modifications to the reference signal are necessary. The accumulation is therefore allowed to proceed as per normal correlator operation. That is, the unmodified reference signal is mixed with the received positioning signal in mixers 604 and 606 to create a mixed signal, then mixed with the code reference signal, and subsequently accumulated in the accumulators 622 and 624.

For the second R-slot, the processor calculates that a phase offset of 180° is required. The offset is applied to the current carrier reference signal phase value to create a modified reference signal as the second R-slot begins and the positioning signal from element 704 is received. The phase offset is applied continually to the carrier NCO value throughout the duration of the R-slot. The modified reference signal is mixed with the received positioning signal to create a mixed signal, then mixed with the code reference signal, and subsequently accumulated with the value of the first R-slot in the accumulators 622 and 624 to create an accumulated signal. The two R-slots are therefore summed together in the accumulation process and the accumulated value at the end of the integration period is therefore representative of the end-fire beam.

Note that the carrier reference signal synthesised by the carrier NCO 608 does not change during the integration period, but is only updated by the carrier lock loop 614 at the end of the integration period.

In embodiments discussed herein, the accumulated signal is created in the accumulator over the entire duration of the integration period. However, in other embodiments, each R-slot is accumulated in its own individual accumulator, the minimum number of accumulators corresponding to the minimum number of R-slots required. In these embodiments, the accumulated signal is obtained from combining the signals in the individual accumulators.

In the embodiments discussed, only one element can be in the first state at any instant within the integration period. Therefore, when element 704 is switched to the first state, element 702 is simultaneously switched to the second state.

After traversing the code lock loop 626, the mixed signal is integrated in the accumulators 622 and 624, creating an accumulated signal. Since the manipulation to the signals occurs serially, the integration of the mixed signal is, in effect, the summation of an infinite number of modified signals over the integration period. Therefore, the accumulated signal is representative of a new beam formed in the desired direction.

Advantages, Applications and Usage

As described above, the antenna array and switching circuit are coupled to the positioning-unit device, while a physically separate positioning receiver performs the required PVT solution to determine the position of the receiver. Since the sequence that the elements of the transmit antenna array are switched to the first state is predetermined, the transmit antenna array type and orientation are known, and the positioning receiver position can be determined, the beams formed in each correlator channel can be directed towards the positioning receiver to maximise the gain of the incoming signal received by the positioning receiver while attenuating signals from other directions, therefore mitigating the effects of multipath.

Current positioning technologies, such as GPS, work well in environments that have direct access to three or four positioning signals. However existing systems are not as useful in closed environments due to the prevalence of multipath.

One solution to restrict multipath is through the formation of beams using an antenna array. As discussed in PCT/AU2010/000839, an antenna array is coupled with the positioning receiver to form a beam to receive a positioning signal which is transmitted from the positioning-unit device via a simple omni-directional antenna.

This specification describes two additional positioning network topologies:

1) using an antenna array coupled with a positioning-unit device to form a remote beam pointing at a positioning receiver, which receives the signal using a simple omni-directional antenna; and
2) using antenna arrays coupled to both the positioning-unit device and the positioning receiver to produce a "composite" beam as shown in FIG. 3.

In some embodiments, these two additional topologies are combined to provide a scalable positioning system. For example, when the positioning receiver is to be integrated into a portable device, such as a cellular or mobile telephone, it can make use of a simple omni-directional antenna, provided that the positioning-unit device is coupled with an antenna array configured to form beams in accordance with the present invention. When a more accurate positioning solution is required or in environments where the positioning-unit device is not equipped with a suitable antenna array, an external antenna array can be configured as an add-on to the portable device for positioning applications. Such external antenna arrays can be made with varying sizes depending on the accuracy of the positioning solution required and in consideration of the size and type of antenna array coupled with the positioning-unit devices in the positioning network.

The tightness of the beam is proportional to the number of elements and, therefore, the physical size of the antenna array. Therefore, it follows that if the antenna array coupled with the positioning-unit device is large, then the antenna array coupled with the positioning receiver may be proportionately smaller and vice versa.

Although the invention has been described with reference to specific examples, it will be appreciated by those skilled in the art that the invention may be embodied in many other forms.

In the claims below and the description herein, any one of the terms "comprising", "comprised of", or "which comprises" is an open term that means including at least the elements/features that follow, but not excluding others. Thus, the term "comprising", when used in the claims, should not be interpreted as being limitative to the means or elements or steps listed thereafter. For example, the scope of the expression a device comprising A and B should not be limited to devices consisting only of elements A and B. Any one of the terms "including", "which includes", or "that includes" as used herein is also an open term that also means including at least the elements/features that follow the term, but not excluding others. Thus, "including" is synonymous with and means the same as "comprising".

The claims defining the invention are as follows:

1. An apparatus for forming a beam remotely at a plurality of spatially distributed antenna elements, the apparatus including:
  a positioning-unit device coupled with a plurality of spatially distributed antenna elements, said positioning-unit device configured to generate a positioning signal and switch said antenna elements between first and second states in a predetermined switching sequence that is synchronised with said positioning signal wherein, in said first state, said antenna elements are configured to transmit said positioning signal; and
  a physically separate receiver configured to receive said positioning signal transmitted from said antenna elements, said receiver having a processor for:
  generating a reference signal;
  modifying said reference signal in substantial synchronisation with the receipt of the positioning signal from the antenna elements being switched to said first state in said switching sequence;
  mixing the received positioning signal with the modified reference signal to generate a mixed signal; and
  summing the mixed signal over a predetermined integration period to generate an accumulated signal that is indicative of the direction and magnitude of a beam formed remotely by said receiver at said antenna elements,
  wherein said switching sequence and its synchronisation with said positioning signal are known to said receiver.

2. The apparatus according to claim 1, wherein said receiver includes at least one receive channel having a correlator, wherein said correlator is configured to selectively manipulate the phase and/or gain of said reference signal in substantial synchronisation with the receipt of the positioning signal from the antenna elements being switched to said first state.

3. The apparatus according to claim 2, wherein said positioning signal includes a pseudorandom code having a unique chip sequence, said unique chip sequence being used to provide the synchronisation of said switching sequence with said positioning signal.

4. The apparatus according to claim 2, wherein the manipulation of said phase and/or gain is achieved by respectively applying a phase and/or gain offset to said reference signal, wherein the value of said phase and/or gain offset is calculated in dependence upon said predetermined switching sequence.

5. The apparatus according to claim 2, wherein said correlator includes a carrier numerically controlled oscillator (NCO) and said reference signal is synthesised in said carrier NCO.

6. The apparatus according to claim 1, wherein said antenna elements are spatially distributed in a three dimensional configuration such that the apparatus can form beams in one or more dimensions.

7. The apparatus according to claim 1, wherein said receiver includes multiple receive channels, wherein each receive channel is adaptable to form at least one beam.

8. The apparatus according to claim 1, wherein antenna elements switched to the second state are configured to be non-resonant such that the effects of mutual-coupling are ameliorated.

9. An apparatus for forming a beam remotely at a plurality of spatially distributed antenna elements, the apparatus including:
  a positioning-unit device coupled with a plurality of spatially distributed antenna elements, said positioning-unit device configured to:
    a) switch said antenna elements between first and second states in a predetermined switching sequence wherein, in said first state, said antenna elements are configured to transmit a positioning signal; and
    b) synthesise a positioning signal and modify said positioning signal, in substantial synchronisation with said predetermined switching sequence, to generate a modified positioning signal;
  and
  a physically separate receiver configured to receive said modified positioning signal transmitted from said antenna elements, said receiver having a processor for generating a reference signal, mixing the received modified positioning signal with said reference signal to generate a mixed signal and summing the mixed signal over a predetermined period to generate an accumulated signal that is indicative of the direction and magnitude of a beam formed remotely by said receiver at said antenna elements.

10. A system for forming composite beams between a plurality of spatially distributed transmit antenna elements and a plurality of spatially distributed receive antenna elements, the system including:
  a positioning-unit device coupled with a plurality of spatially distributed transmit antenna elements, said positioning-unit device being configured to generate a positioning signal and switch said transmit antenna elements between first and second states in a first predetermined switching sequence that is synchronised with said positioning signal wherein, in said first state, said transmit antenna elements are configured to transmit said positioning signal; and
  a physically separate positioning receiver coupled with a plurality of spatially distributed receive antenna elements, said positioning receiver being configured to switch said receive antenna elements between first and second states in a second predetermined switching sequence wherein, in said first state, said receive antenna elements are configured to receive said positioning signal;
  said positioning receiver having a processor configured to:
    receive, at said receive antenna elements, said positioning signal transmitted from said transmit antenna elements;
    synthesize a reference signal;
    modify said reference signal in substantial synchronisation with the receipt of the positioning signal from the transmit antenna elements being switched to said first state in said first predetermined switching sequence, and in substantial synchronisation with the switching of said receive antenna elements to the first state in said second predetermined switching sequence, to generate a modified reference signal;
    mix the received positioning signal with said modified reference signal to generate a mixed signal; and
    sum the mixed signal over a predetermined integration period to generate an accumulated signal that is indicative of the direction and magnitude of a composite beam formed by said positioning receiver between said transmit antenna elements and said receive antenna elements,
  wherein said first predetermined switching sequence and its synchronisation with said positioning signal are known to said positioning receiver.

11. A method for forming a beam remotely at a plurality of spatially distributed antenna elements coupled with a positioning-unit device, the method including the steps of:
  a) generating, at said positioning-unit device, a positioning signal;
  b) switching, at said positioning-unit device, said spatially distributed antenna elements from a second state to a first state in a predetermined switching sequence that is synchronised with said positioning signal, wherein, in said first state, said antenna elements are configured to transmit said positioning signal;
  c) receiving, at a physically separate receiver, the transmitted positioning signal;
  d) generating, in a correlator of the receiver, a reference signal for correlation with the received positioning signal;
  e) applying, in substantial synchronisation with the receipt of the positioning signal from the antenna elements being switched to said first state in said switching sequence, a predetermined offset to said reference signal to create a modified reference signal;
  f) mixing said received positioning signal with said modified reference signal to create a mixed signal; and
  g) accumulating said mixed signal over an integration period to create an accumulated signal that is indicative of the direction and magnitude of a beam formed remotely by said receiver at said antenna elements,
  wherein said switching sequence and its synchronisation with said positioning signal are known to said receiver.

12. A method for forming composite beams between a plurality of spatially distributed transmit antenna elements coupled with a positioning-unit device and a plurality of spatially distributed receive antenna elements coupled with a positioning receiver that is physically separate from said positioning-unit device, the method including the steps of:
  a) generating, at said positioning-unit device, a positioning signal;
  b) switching, at said positioning-unit device, said spatially distributed transmit antenna elements from a second state to a first state in a first predetermined switching sequence that is synchronised with said positioning signal, wherein, in said first state, said transmit antenna elements are configured to transmit said positioning signal;
  c) switching, at said positioning receiver, said spatially distributed receive antenna elements from a second state to a first state in a second predetermined switching sequence, wherein, in said first state, said receive antenna elements are configured to receive said positioning signal;
  d) receiving, at said positioning receiver, the transmitted positioning signal;
  e) generating, in a correlator of said positioning receiver, a reference signal for correlation with the received positioning signal;
  f) modifying said reference signal in substantial synchronisation with the receipt of the positioning signal from the transmit antenna elements being switched to said first state in said first predetermined switching sequence, and in substantial synchronisation with the switching of said receive antenna elements to the first state in said second predetermined switching sequence, to generate a modified reference signal;
  g) mixing said received positioning signal with said modified reference signal to create a mixed signal; and
  h) accumulating said mixed signal over an integration period to create an accumulated signal that is indicative of the direction and magnitude of a composite beam formed by said positioning receiver between said transmit antenna elements and said receive antenna elements,
  wherein said first predetermined switching sequence and its synchronisation with said positioning signal are known to said positioning receiver.

13. A method for forming a beam remotely at a plurality of spatially distributed antenna elements coupled with a positioning-unit device, the method including the steps of:
  a) synthesising, in said positioning-unit device, a positioning signal;
  b) switching, at said positioning-unit device, said spatially distributed antenna elements from a second state to a first state in a predetermined switching sequence, wherein, in said first state, said antenna elements are configured to transmit said positioning signal;
  c) applying, in substantial synchronisation with the switching of one of said antenna elements to the first state, a predetermined offset to said positioning signal to create a modified positioning signal;

d) receiving, at a physically separate receiver, said modified positioning signal transmitted by said antenna elements;

e) generating, in a correlator of the receiver, a reference signal for correlation with the received modified positioning signal;

f) mixing said received modified positioning signal with said reference signal to create a mixed signal; and g) accumulating said mixed signal over an integration period to create an accumulated signal that is indicative of the direction and magnitude of a beam formed remotely by said receiver at said antenna elements.

14. The apparatus according to claim 1, wherein said apparatus is configured to take into account a transmission delay that occurs between generation of said positioning signal and transmission of said positioning signal through said antenna elements.

15. The system according to claim 10, wherein said positioning receiver includes at least one receive channel having a correlator, wherein said correlator is configured to selectively manipulate the phase and/or gain of said reference signal in substantial synchronisation with the receipt of the positioning signal from the transmit antenna elements being switched to said first state, and in substantial synchronisation with the switching of the receive antenna elements to said first state.

16. The system according to claim 15, wherein said positioning signal includes a pseudorandom code having a unique chip sequence, said unique chip sequence being used to provide the synchronisation of said first predetermined switching sequence with said positioning signal.

17. The system according to claim 10, wherein said system is configured to take into account a transmission delay that occurs between generation of said positioning signal and transmission of said positioning signal through said transmit antenna elements.

18. The system according to claim 10, wherein said predetermined integration period is divided into a number of sub-integration periods which are determined by the overlap of the periods of receipt of the positioning signal from the transmit antenna elements being switched to said first state, and the periods of the switching of the receive antenna elements to said first state.

19. The system according to claim 15, wherein the manipulation of said phase and/or gain is achieved by respectively applying a phase and/or gain offset to said reference signal, wherein the value of said phase and/or gain offset is calculated in dependence upon said first and second predetermined switching sequences.

20. The method according to claim 11, wherein the step of applying a predetermined offset to said reference signal comprises selective manipulation of the phase and/or gain of said reference signal in substantial synchronisation with the receipt of the positioning signal from the antenna elements being switched to said first state.

21. The method according to claim 11, wherein said positioning signal includes a pseudorandom code having a unique chip sequence, said unique chip sequence being used to provide the synchronisation of said switching sequence with said positioning signal.

22. The method according to claim 11, further comprising the step of taking into account a transmission delay that occurs between generation of said positioning signal and transmission of said positioning signal through said antenna elements.

23. The method according to claim 20, wherein the gain and/or phase manipulations are applied to said reference signal throughout the entirety of the allocated periods of receipt of the positioning signal from the antenna elements being switched to said first state.

24. The method according to claim 20, wherein the manipulation of said phase and/or gain is achieved by respectively applying a phase and/or gain offset to said reference signal, wherein the value of said phase and/or gain offset is calculated in dependence upon said predetermined switching sequence.

25. The method according to claim 24, wherein the value of said phase and/or gain offset is calculated in real time, or is calculated in advance and stored in a database that is available for retrieval.

26. The method according to claim 12, wherein the step of modifying said reference signal comprises selective manipulation of the phase and/or gain of said reference signal in substantial synchronisation with the receipt of the positioning signal from the transmit antenna elements being switched to said first state, and in substantial synchronisation with the switching of the receive antenna elements to said first state.

27. The method according to claim 12, wherein said positioning signal includes a pseudorandom code having a unique chip sequence, said unique chip sequence being used to provide the synchronisation of said first predetermined switching sequence with said positioning signal.

28. The method according to claim 12, further comprising the step of taking into account a transmission delay that occurs between generation of said positioning signal and transmission of said positioning signal through said transmit antenna elements.

29. The method according to claim 12, wherein said integration period is divided into a number of sub-integration periods which are determined by the overlap of the periods of receipt of the positioning signal from the transmit antenna elements being switched to said first state, and the periods of the switching of the receive antenna elements to said first state.

30. The method according to claim 26, wherein the manipulation of said phase and/or gain is achieved by respectively applying a phase and/or gain offset to said reference signal, wherein the value of said phase and/or gain offset is calculated in dependence upon said first and second predetermined switching sequences.

* * * * *